US005996198A

United States Patent [19]

Wang et al.

[11] Patent Number: 5,996,198

[45] Date of Patent: Dec. 7, 1999

[54] APPARATUS FOR RIBBING CLOTH VENETIAN BLIND STRIPS

[76] Inventors: Cherng-Fa Wang, 5F-23, No. 70, Fu Hsing Road, Tao Yuan City; Hsi-Chuan Chiou, No. 6, Alley 186, Lane 75, Kang Ning Road, Section 3, Nei Hu, Taipei, both of Taiwan

[21] Appl. No.: 09/030,089

[22] Filed: Feb. 25, 1998

[51] Int. Cl.[6] ...................................................... B23P 19/04

[52] U.S. Cl. ................................ 29/24.5; 29/464; 29/771; 112/470.33; 112/146

[58] Field of Search ............................ 29/464, 24.5, 771, 29/779; 112/470.33, 146

[56] References Cited

U.S. PATENT DOCUMENTS

| | | | |
|---|---|---|---|
| 3,264,724 | 8/1966 | Griesser | 29/779 |
| 4,573,421 | 3/1986 | Mall et al. | 112/146 |
| 5,127,138 | 7/1992 | Lim | 29/24.5 |
| 5,493,981 | 2/1996 | Del Castillo | 112/470.14 |

*Primary Examiner*—S. Thomas Hughes
*Assistant Examiner*—Steven A Blount
*Attorney, Agent, or Firm*—Dougherty & Troxell

[57] ABSTRACT

Disclosed is an apparatus for ribbing cloth venetian blind strips in an efficient and mass production manner. The apparatus includes a group of strip pressing mechanisms which hold a strip to be ribbed in place and define a reference plane for other mechanisms in the apparatus during the ribbing operation. After the strip is pressed in place, a tubular space opening mechanism is actuated to open front ends of two previously flattened tubular spaces at two sides of the strip. Thereafter, two tubular space expanding mechanisms pushes the strip from the two sides thereof to vertically expand the already partially opened tubular spaces, allowing ribs to be fed into and extended through the expanded tubular spaces by a rib conveying mechanism. The cloth strips for venetian blind can therefore be accurate, quickly ribbed at two sides in a mass production manner.

12 Claims, 8 Drawing Sheets

APPARATUS FOR RIBBING CLOTH VENETIAN BLIND STRIPS

BACKGROUND OF THE INVENTION

Venetian blind is widely welcomed by consumers and has gradually taken the place of conventional cloth curtains in the market due to the convenient operation, angle-adjustable strips, and low cost of the venetian blind. A new type of venetian blind formed from cloth-made strips has developed considerable potential in the market. Such cloth strips are usually provided with side ribs to increase their rigidity. The present invention relates to an apparatus for automatically ribbing the cloth strips of a venetian blind, so that such cloth venetian blind strips can be ribbed in an accurate, efficient, and mass production manner.

SUMMARY OF THE INVENTION

It is a primary object of the present invention to provide an apparatus for ribbing cloth venetian blind strips, so that such cloth venetian blind strips can be ribbed in a mass production manner to reduce production cost thereof.

Another object of the present invention is to provide an apparatus for ribbing cloth venetian blind strips that has simple structure and small volume, and can be easily and economically installed without occupying too much space.

To achieve the above and other objects, the apparatus according to the present invention mainly includes three groups of strip pressing mechanisms which hold a strip to be ribbed in place and define a reference plane for other mechanisms in the apparatus during the ribbing operation. After the strip is pressed in place, a tubular space opening mechanisms is actuated to open front ends of two previously flattened tubular spaces at two sides of the strip to be ribbed. Thereafter, two tubular space expanding mechanisms pushes the strip from two sides thereof to vertically expand the already partially opened tubular spaces, allowing ribs to be fed into and extended through the expanded tubular spaces by a rib conveying mechanism. The cloth strips for venetian blind can therefore be accurate, quickly ribbed at two sides in a mass production manner.

DETAILED DESCRIPTION OF THE PREFERRED EMBODIMENT

Figure 1:
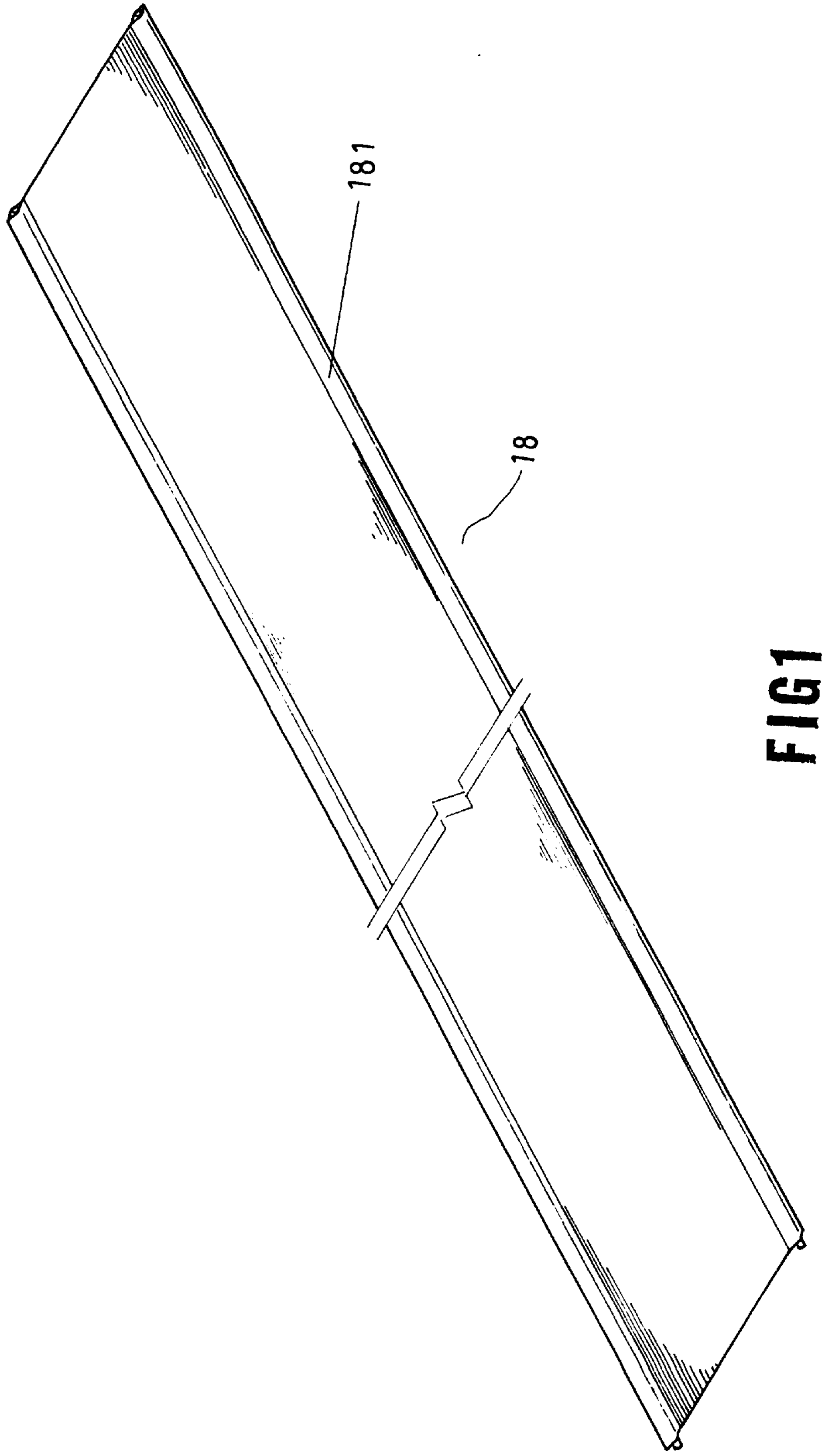
FIG. 1 is a perspective of a cloth venetian blind strip for which the present invention is designed.

Please refer to FIG. 1 in which a cloth-made strip 18 for venetian blind is shown. Two tubular spaces 181 are formed on two sides of the strip 18 through sewing or other similar ways for receiving two ribs 17 therein to achieve a designed rigidity of the cloth strip 18. The present invention provides means to extend ribs 17 into the tubular spaces 181 in an automatic and efficient manner to enable mass production of such cloth venetian blind strips.

The present invention is an apparatus for ribbing the cloth venetian blind strip and mainly includes three upper strip pressing mechanisms A, B, and C, three lower strip pressing mechanisms D, E, and F, a tubular space opening mechanism H, two tubular space expanding mechanisms G and I, a rib conveying mechanism J, and a work platform K.

Figure 5:
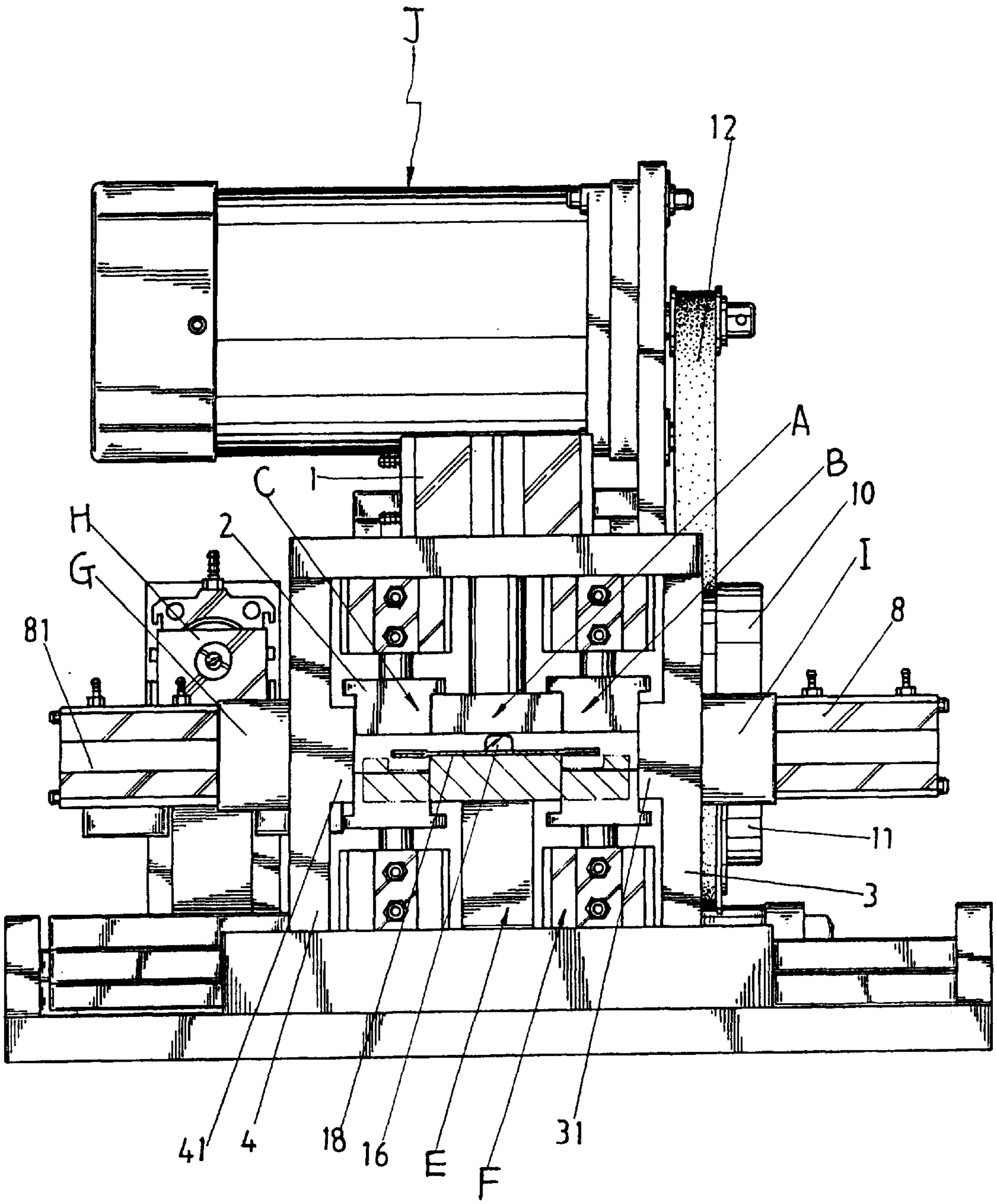
FIG. 5 is a front elevation showing the state of the present invention before a cloth venetian blind strip is fed into the apparatus for ribbing.

Please refer to FIG. 5. The lower strip pressing mechanism E is located between the other two lower strip pressing mechanisms D and F and is always maintained at a fixed height in the apparatus to define a reference plane for the other strip pressing mechanisms. The upper strip mechanism A is located immediately above the mechanism E. The upper and the lower strip pressing mechanisms C and D are correspondingly located to one side of the mechanisms A and E while the upper and the lower strip pressing mechanisms B and F to another side of the mechanisms A and E. Each of the upper and lower strip pressing mechanisms A to D and F is composed of a cylinder 1 and a pressing plate 2 which can be brought by the cylinder 1 to reciprocate up and down. The strip pressing mechanism E, on the other hand, has a stationary pressing plate 2 which defines the reference plane. To enable the pressing plates 2 of the strip pressing mechanisms B, C, D, and F to be co-planar with the pressing plate 2 of the strip pressing mechanism E during the ribbing operation, two walls 3, 4 with inward projected central portions 31, 41, respectively, are provided in the apparatus and the pressing plates 2 of the strip pressing mechanisms B, C, D, and F are designed to have a size-enlarged rear portion, such that when the pressing plates 2 of the mechanisms B, C, D, and F are moved to be co-planar with the pressing plates 2 of the mechanisms A and E, the enlarged rear portions of the pressing plates 2 of the upper strip pressing mechanisms B, C shall fitly contact with and be stopped by top surfaces of the projected central portions 31, 41 of the walls 3, 4 as well as a rear surface of the pressing plate 2 of the mechanism A, and, the enlarged rear portions of the pressing plates 2 of the lower strip pressing mechanisms F, D shall fitly contact with and be stopped by bottom surfaces of the projected central portions 31, 41 as well as a rear surface of the pressing plate 2 of the mechanism E, as shown in FIG. 6.

Figure 2:
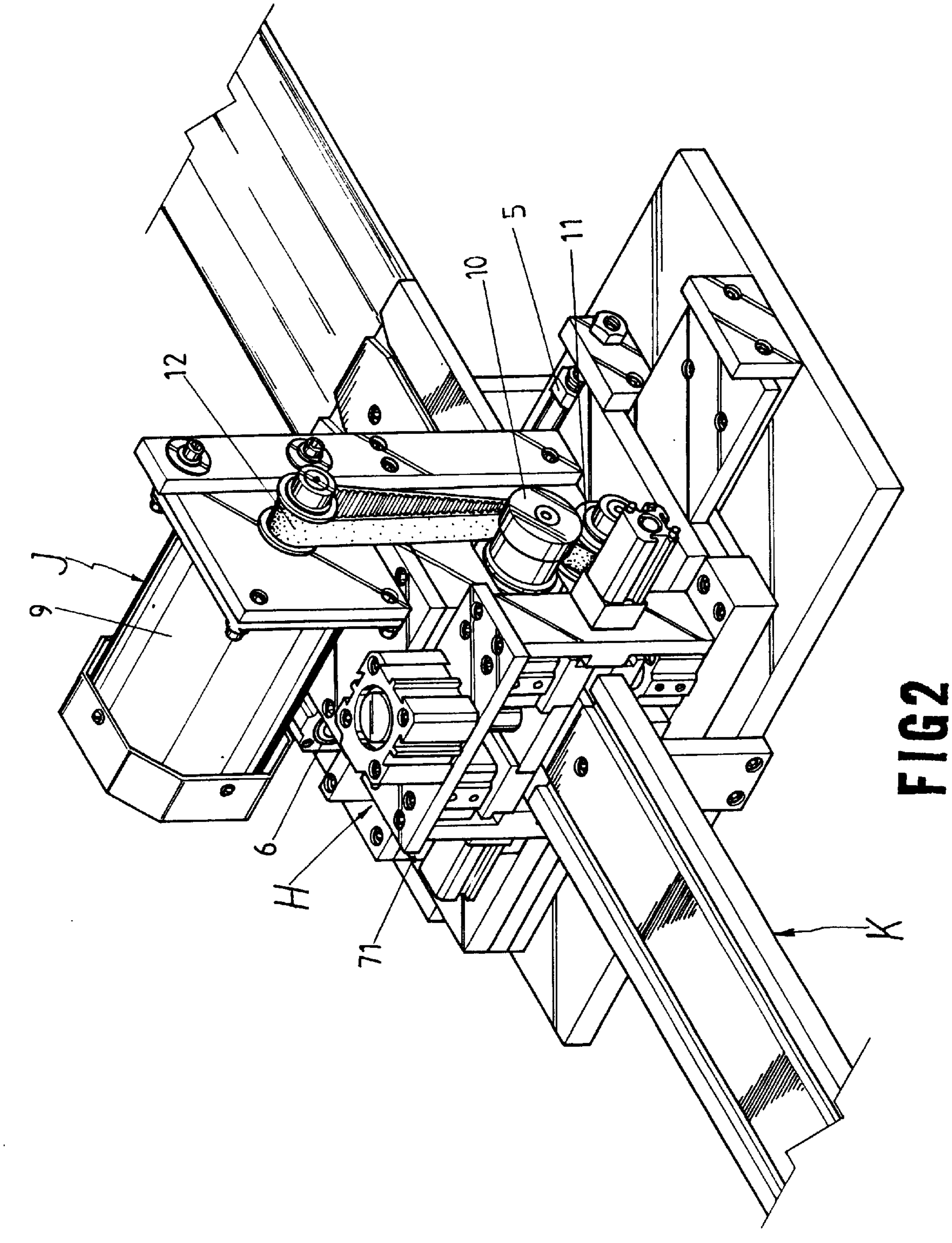
FIG. 2 is an assembled top perspective of the apparatus according to the present invention.
Figure 3:
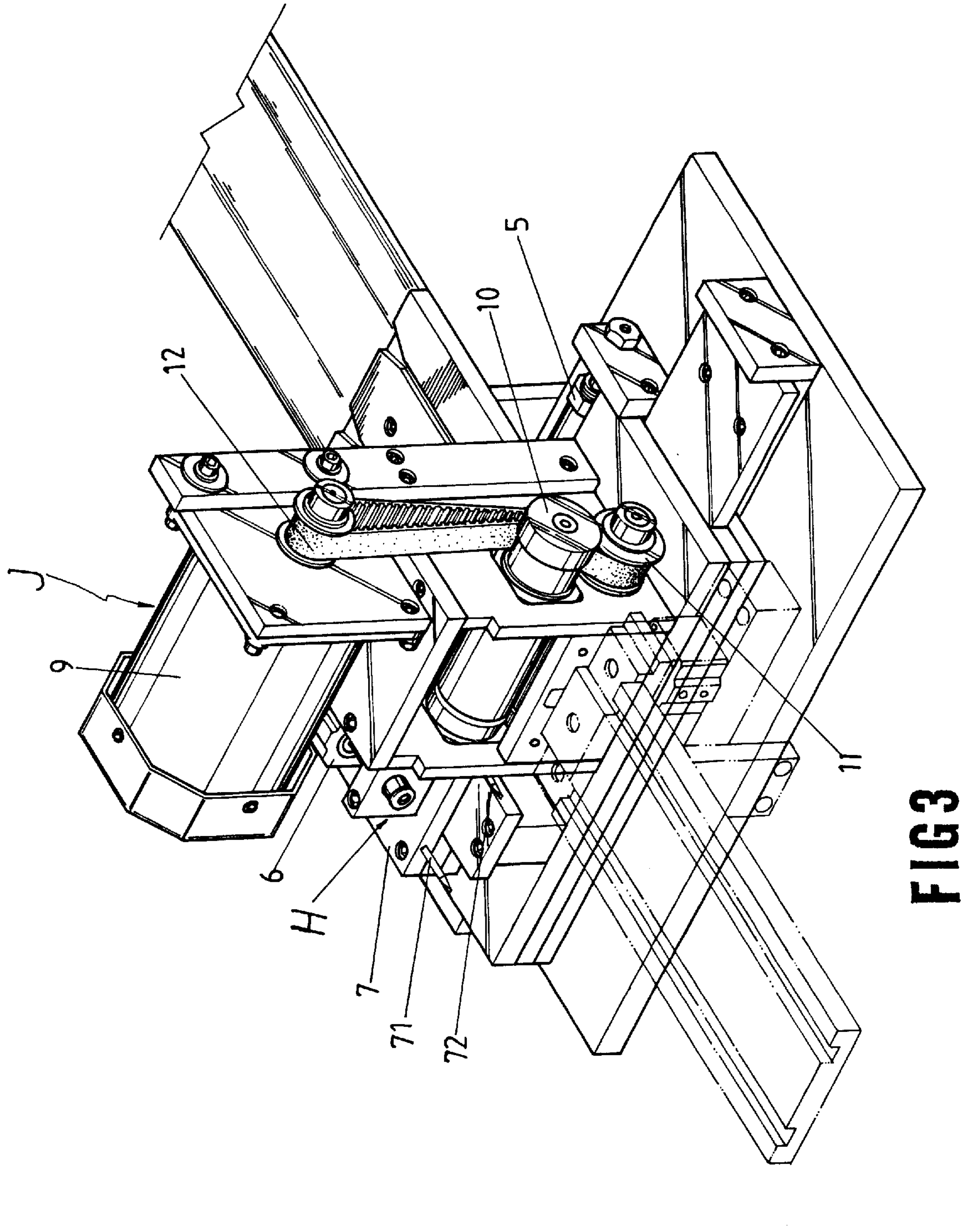
FIG. 3 is another assembled top perspective of the present invention.

Please refer to FIGS. 2 and 3 at the same time. The tubular space opening mechanism H is located to one outer side of the walls 3, 4 and behind the strip pressing mechanisms A to F. The mechanism H also has a lower surface in the same reference plane defined by the mechanism E. The mechanism H is brought by a first cylinder 5 to reciprocate transversely on the apparatus and by a second cylinder 6 to reciprocate longitudinally. A seat 7 included in the mechanism H is pivotally connected to a front of the second cylinder 6. Two pins 71, 72 having horizontally flat and thin front ends are spacedly mounted on a transverse central line of the seat 7. A distance between the two spaced pins 71, 72 exactly equals a distance between central points of the two tubular spaces 181 on two sides of the strip 18. Moreover, the flat and thin front ends of the pins 71, 72 will be brought by the second cylinder 6 to align with a horizontal line contained in the same reference plane defined by the pressing plate 2 of the mechanism E when the upper strip pressing mechanisms B, C and the lower mechanisms F, D are moved to correspondingly and closely contact with one another in the reference plane defined by the mechanism E.

Figure 6:
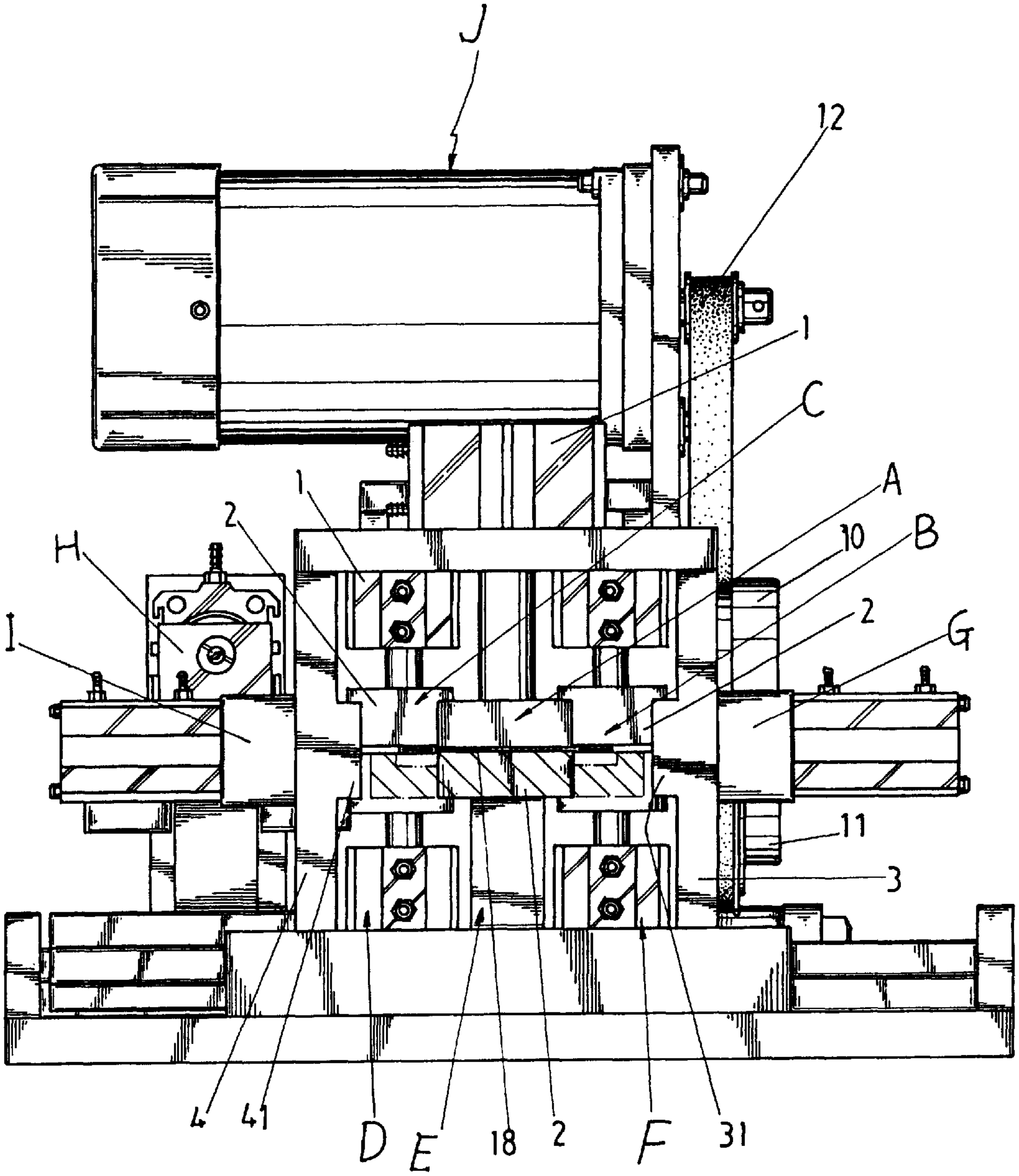
FIG. 6 is still a front elevation showing the strip pressing mechanisms in the present invention are caused to press and hold the strip in place.
Figure 7:
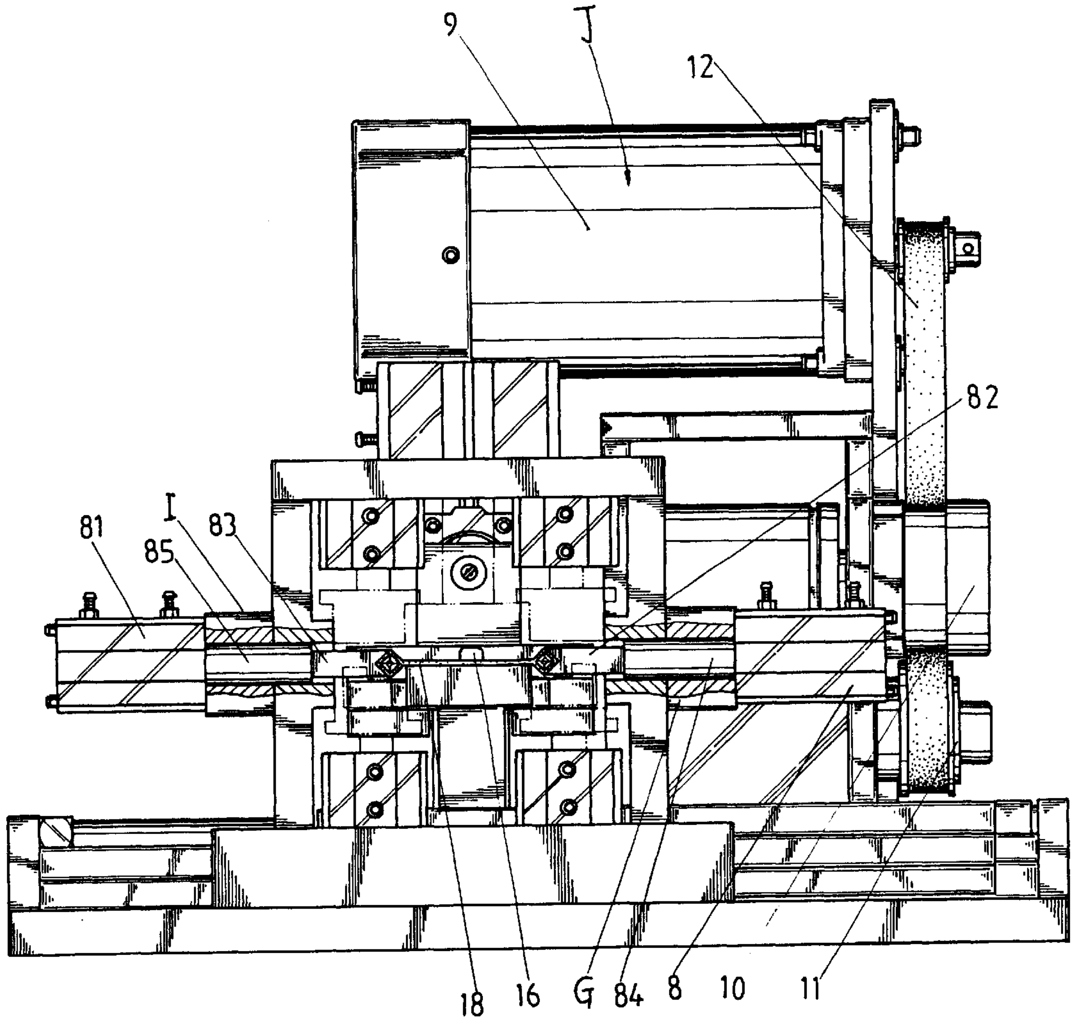
FIG. 7 is a front elevation similar to FIG. 5 showing two tubular space expanding mechanisms in the present invention push against the tubular spaces on the cloth strip to vertical expand them.

Please refer to FIGS. 5, 6, and 7 at the same time. The tubular space expanding mechanisms G and I are symmetrically mounted at vertically central portions of the walls 3 and 4, respectively. The mechanisms G, I are respectively composed of a cylinder 8, 81 and a forked member 82, 83 mounted on a cylinder shaft 84, 85 of the cylinder 8, 81. The forked members 82, 83 both have upper and lower prongs at their front end to define a forward-facing, right-angled opening. The cylinder shafts 84, 85 respectively extend through central areas of the inward projected central portions 31, 41 of the walls 3, 4, such that a line passing centers of the forked members 82, 83 is in the reference plane defined by the mechanism E when the pressing plates 2 of the upper and lower strip pressing mechanisms C, A, B and D, E, F are caused to correspondingly and closely contact with one another.

Figure 4:
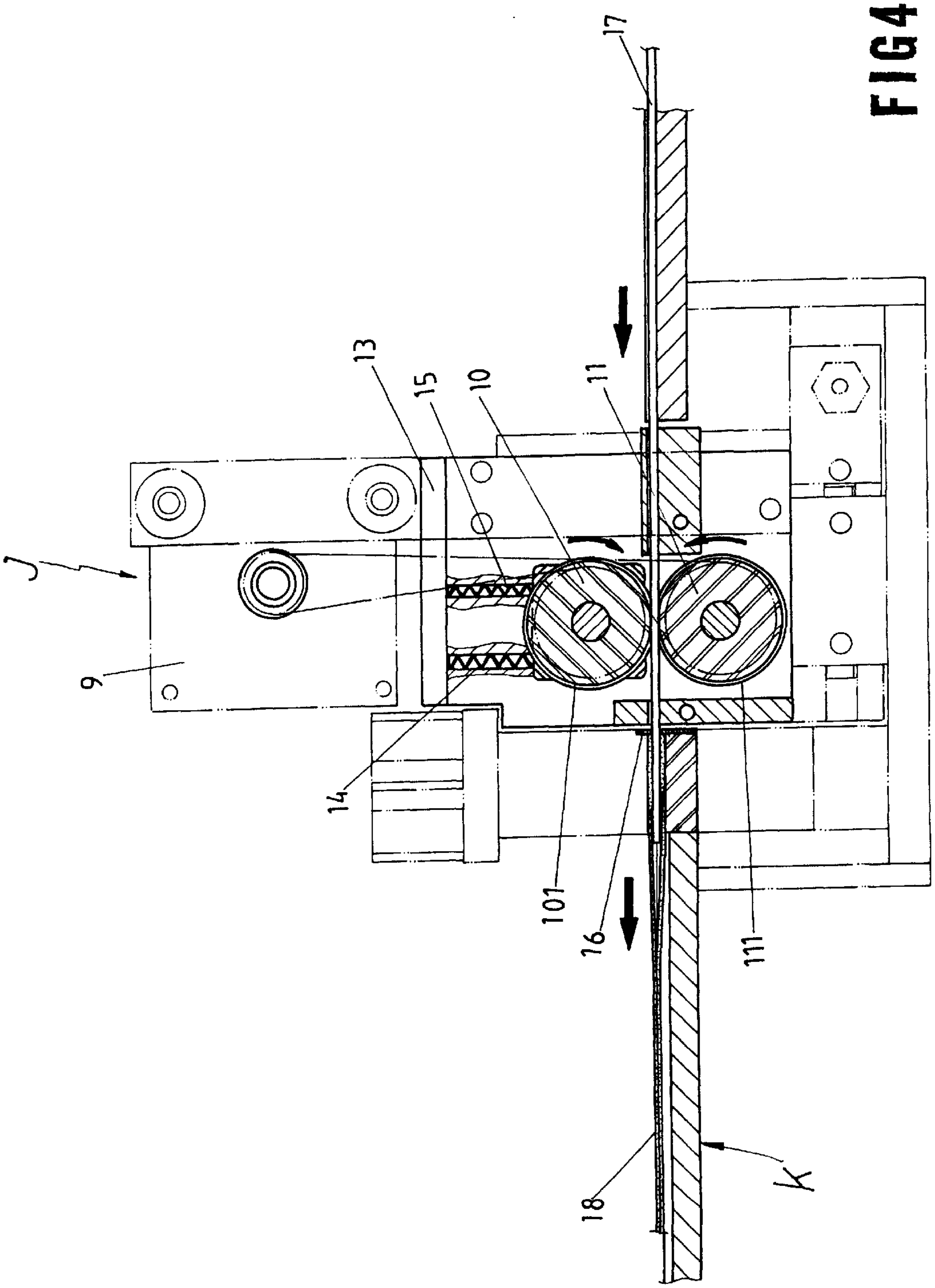
FIG. 4 is a vertical, side, sectional view showing the relation between the rib conveying mechanism and the cloth strip in their positions during the ribbing operation.

Please now refer to FIGS. 4 and 5 at the same time. The rib conveying mechanism J is composed of a motor 9 and upper and lower pressing rollers 10, 11. The upper and the lower pressing rollers 10, 11 are similar in their structure and are correspondingly mounted on two roller shafts fixed in the apparatus, so that the rollers 10, 11 are located in a space provided between front and rear parts of the work platform K. A belt 12 is wound about a rotating shaft of the motor 9 at one end and about the lower pressing roller 11 at the other end with the upper roller 10 contacting with one outer surface of the belt 12. By this way, when the motor 9 is started to rotate its rotating shaft, the upper and the lower rollers 10, 11 are brought by the belt 12 to synchronously rotate in opposite directions. The upper and the lower rollers 10, 11 are provided around their circumferential surfaces with corresponding recesses 101, 111, respectively, to define between them a height just sufficient for receiving a rib 17 therein between the rollers 10 and 11, such that when the rollers 10, 11 rotate and press against the rib 17 extending through the recesses 101, 111, the rib 17 is brought to move forward between the rollers 10, 11. Moreover, two compression springs 14, 15 are disposed in two spaces extending between the upper roller 10 and a cover plate 13 above the roller 10. When the compression springs 14, 15 are compressed, the roller 10 is allowed to shift upward for a flexible distance from about 2 mm to about 3 mm, so that ribs 17 having diametrical size difference within this range all can pass between the upper and lower rollers 10, 11 via the recesses 101, 111.

A stopper 16 is provided at an inner edge of the front part of the work platform K for stopping the strip 18 from moving any further when it is fed into the work platform K between the upper and the lower strip pressing mechanisms A to F. By this way, every strip 18 can be inserted into the apparatus at a fixed distance.

Figure 8:
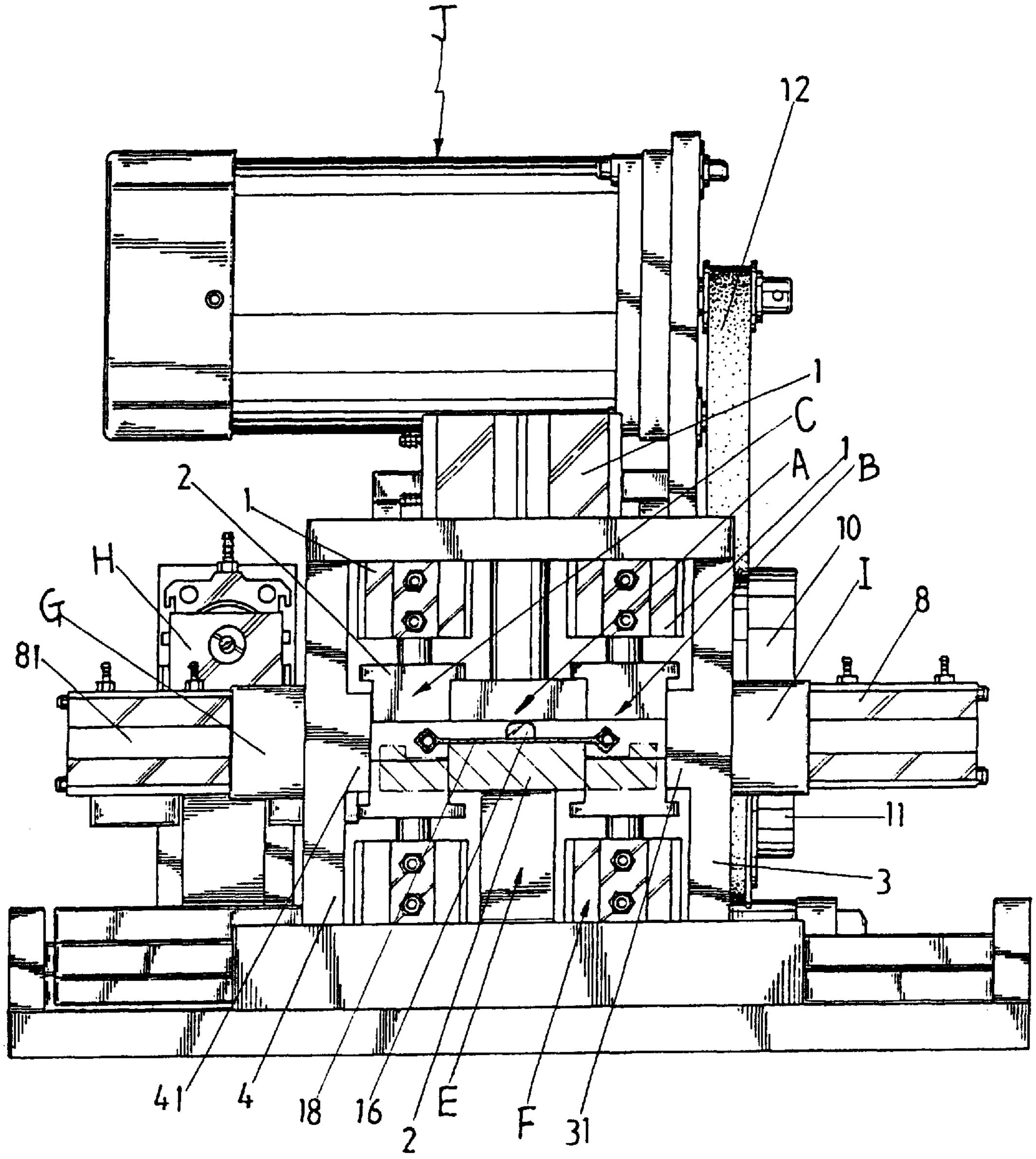
FIG. 8 is still a front elevation showing the state of the apparatus of the present invention after ribs have been extended into the tubular spaces on the cloth venetian blind strip.

FIGS. 5 to 8 illustrate operations of the present invention. FIG. 5 shows the apparatus in a standby position. At this point, a strip 18 can be fed lengthwise into the work platform K from a space between the upper and the lower strip pressing mechanisms that are not yet pressed together now. When the strip 18 reaches and is stopped by the stopper 16, the upper strip pressing mechanisms C, A, B are moved downward and the lower mechanisms D, F upward until their pressing plates 2 reach at the reference plane defined by the pressing plate 2 of the mechanism E and closely contact with one another to firmly press the inserted strip 18 in place. Then, the upper strip pressing mechanisms B, C and the lower mechanisms F, D at outer sides are moved away from the reference plane while the mechanisms A and F keep unchanged in their closely contact position, as shown in FIG. 6. At the same time, the tubular space opening mechanism H is first transversely moved inward behind the strip pressing mechanisms and is then longitudinally moved forward, so that the pins 71, 72 are moved in place to separately open the previously flattened tubular spaces 181 at two sides of the strip 18. The tubular space opening mechanism H returns to its original standby position after the flattened tubular spaces 181 are partially opened at their one end by the pins 71, 72. At this point, the cylinders 8, 81 of the two tubular space expanding mechanisms G, I, respectively, bring the forked members 82, 83 connected to the front ends of the cylinder shafts 84, 85 to push against the already opened tubular spaces 181, so that the spaces 181 are expanded in vertical direction, as shown in FIG. 7. The tubular space expanding mechanisms G, I return to their original standby positions after the tubular spaces 181 are vertically expanded. At this point, ribs 17 can be inserted into the opened and vertically expanded tubular spaces 181 and the rib conveying mechanism J is actuated to rotate the upper and lower pressing rollers 10, 11 to quickly send the ribs 17 into the tubular spaces 181, as shown in FIG. 4. Thereafter, the strip pressing mechanism A is moved away from the reference plane defined by the strip pressing mechanism E to release the strip 18 previously pressed between the mechanisms A and E, as shown in FIG. 8. The same procedures can be repeated to rib subsequent strips 18 on the apparatus of the present invention.

What is claimed is:

1. An apparatus for inserting ribs into cloth venetian blind strips having tubular rib spaces at two sides, the apparatus comprising:

three upper strip pressing mechanisms and three vertically corresponding lower strip pressing mechanisms, a middle lower strip pressing mechanism being located at a middle position fixedly mounted in said apparatus and having a surface defining a reference plane;

a tubular rib space opening mechanism mounted behind and to one outer side of said upper and lower strip pressing mechanisms and movable in said reference plane;

two opposite tubular rib space expanding mechanisms mounted on vertical central areas of two walls at two sides of said upper and lower strip pressing mechanisms, each expanding mechanism comprising a cylinder and a forked member connected to a movable shaft of said cylinder;

a rib conveying mechanism comprising a motor, and upper and lower pressing rollers rotated in opposite directions by said motor; and a work platform having a stopper mounted at a front edge of said work platform to define a distance to which each of said venetian blind strips is fed into said apparatus between said upper and lower strip pressing mechanisms.

2. The apparatus for inserting ribs into cloth venetian blind strips as claimed in claim 1, wherein said three upper strip pressing mechanisms and two of said lower strip pressing mechanisms located at two outer sides of said middle lower strip pressing mechanisms each comprise a cylinder and a pressing plate connected to a movable shaft of said cylinder, such that said pressing plates are reciprocated by said cylinders relative to said lower strip pressing mechanism fixedly mounted in said apparatus.

3. The apparatus for inserting ribs into cloth venetian blind strips as claimed in claim 2, wherein said two walls at two sides of said strip pressing mechanisms have inner sides of said vertical central areas with inward projecting portions.

4. The apparatus for inserting ribs into cloth venetian blind strips as claimed in claim 3, wherein said pressing plates of two of said three upper strip pressing mechanisms and said lower strip pressing mechanisms at two outer sides of said middle lower strip pressing mechanism each have an enlarged rear portion.

5. The apparatus for inserting ribs into cloth venetian blind strips as claimed in claim 1, wherein said tubular rib space opening mechanism comprises first and second cylinders to reciprocate said tubular space opening mechanism transversely and longitudinally, respectively, relative to said strip pressing mechanisms.

6. The apparatus for inserting ribs into cloth venetian blind strips as claimed in claim 5, wherein said second cylinder of said tubular space opening mechanism comprises a seat pivotally connected to a front of said tubular space opening mechanism, and two spaced pins provided on a transverse central axis of said seat.

7. The apparatus for inserting ribs into cloth venetian blind strips as claimed in claim 6, wherein said two spaced pins of said tubular space opening mechanism have horizontally flat and thin front ends, and wherein a distance between said two spaced pins is equal to a distance between longitudinal central axes of said two tubular rib spaces on two sides of said strip.

8. The apparatus for inserting ribs into cloth venetian blind strips as claimed in claim 7, wherein said flat and thin front ends of said two spaced pins are aligned with said reference plane.

9. The apparatus for inserting ribs into cloth venetian blind strips as claimed in claim 1, wherein said forked members of said tubular space expanding mechanisms have upper and lower prongs that define a right-angled forward opening between them, said forked members being mounted on cylinder shafts transversely passing through projecting portions at inner sides of said vertical central areas of said two walls, such that said forked members are located in said reference plane.

10. The apparatus for inserting ribs into cloth venetian blind strips as claimed in claim 1, wherein said upper and lower pressing rollers of said rib conveying mechanism are vertically aligned and are mounted on roller shafts fixedly mounted in said apparatus between a front part and a rear part of said work platform and further comprising a belt drivingly connected to said roller shafts and to a shaft of said motor of said rib conveying mechanism such that said upper and said lower pressing rollers rotate synchronously in opposite directions.

11. The apparatus for inserting ribs into cloth venetian blind strips as claimed in claim 10, wherein said upper and lower pressing rollers have circumferential surfaces with corresponding recesses, a clearance between said recesses being large enough to receive one of said ribs therein, so that said rib can be moved forward by said pressing rollers to extend into said tubular rib spaces of said strip.

12. The apparatus for inserting ribs into cloth venetian blind strips as claimed in claim 11, further comprising two compression springs extending between said upper pressing roller and a top cover plate located above said upper pressing roller, enabling said upper pressing roller to move upward within a predetermined range.

* * * * *